United States Patent [19]
Satoh et al.

[11] Patent Number: 5,790,490
[45] Date of Patent: Aug. 4, 1998

[54] ANTI-SHAKE CAMERA

[75] Inventors: Tatsuya Satoh, Tokyo; Tsuyoshi Yaji, Saitama-ken, both of Japan

[73] Assignee: Olympus Optical Co., Ltd., Tokyo, Japan

[21] Appl. No.: 853,269

[22] Filed: May 9, 1997

[30] Foreign Application Priority Data

May 10, 1996 [JP] Japan ................................ 8-116559

[51] Int. Cl.[6] ................................................ G03B 17/38
[52] U.S. Cl. ................................................ 396/52; 396/266
[58] Field of Search ................................ 396/52–55, 266

[56] References Cited

U.S. PATENT DOCUMENTS 5,150,150  9/1992  Enomoto ................................ 354/456

FOREIGN PATENT DOCUMENTS

63-53531 A   3/1988   Japan .
5204012A     8/1993   Japan .
5204013A     8/1993   Japan .
5204014A     8/1993   Japan .

*Primary Examiner*—W. B. Perkey
*Attorney, Agent, or Firm*—Kenyon & Kenyon

[57] ABSTRACT

An anti-shake camera measures a shaking movement of the camera around at least a first dimension and around a second dimension (e.g., X and Y dimensions). Based on these measured camera shake values, the anti-shake camera generates a forecasted camera shake value for each measured dimension of motion. When both of these forecasted camera shake values achieves a predetermined level, such as zero, within a predetermined time, the anti-shake camera begins an exposure operation.

14 Claims, 6 Drawing Sheets

ANTI-SHAKE CAMERA

BACKGROUND OF THE INVENTION

The present invention relates to a camera that can detect a shaking motion of the camera. The camera of the present invention begins an exposure operation when the shaking motion is at a minimum.

In U.S. Pat. No. 5,150,150, a camera of this type detects the absolute value of the angular velocity of the camera shake. This camera starts an exposure operation when the absolute angular velocity is less than a predetermined level, or when the angular velocity is decreasing and is less than the predetermined level. Japanese laid-open application No. 88-53531 discloses a camera which starts an exposure operation at the peak of a displacement of the camera, that is, at the point when the velocity of a camera shake is zero.

However, the camera disclosed in U.S. Pat. No. 5,150,150 starts an exposure operation after detecting that the angular velocity along both of two dimensions perpendicular to each other are less than a predetermined level at the same time. As a consequence, this detection lengthens a time lag existing between the actuation of a release button on the camera and the actual initiation of the exposure operation. Furthermore, if the predetermined level is large enough, the time lag would be smaller but the camera shake at the point when exposure begins would be more pronounced.

In a camera disclosed in Japanese laid-open patent application No. 88-53531, the shake detection is normally done for the X axis and for the Y axis on an image plane. Nevertheless, the camera shake velocities measured along the X and Y axes do not often become zero at the same time. Consequently, it makes the time lag before the beginning of the exposure longer. After all, there would be a problem that the time lag from pushing a release button by a operator to the actual beginning of the exposure would be quite long.

SUMMARY OF THE INVENTION

An object of this invention is to provide a camera that reduces the picture blurring that results from the shaking motion of the camera.

Another object of this invention is to provide a camera that can reduce the influence caused by the camera shake and that minimizes the time lag from the instruction for starting the exposure to the actual exposure start. According to this invention, the camera begins the exposure when the shake condition in each direction achieves a predetermined level within a certain period of time.

DETAILED DESCRIPTION

The entire disclosure of Japanese Patent Application No. 96-116559 filed on May 10, 1996, is incorporated herein by reference in its entirety.

Figure 1:
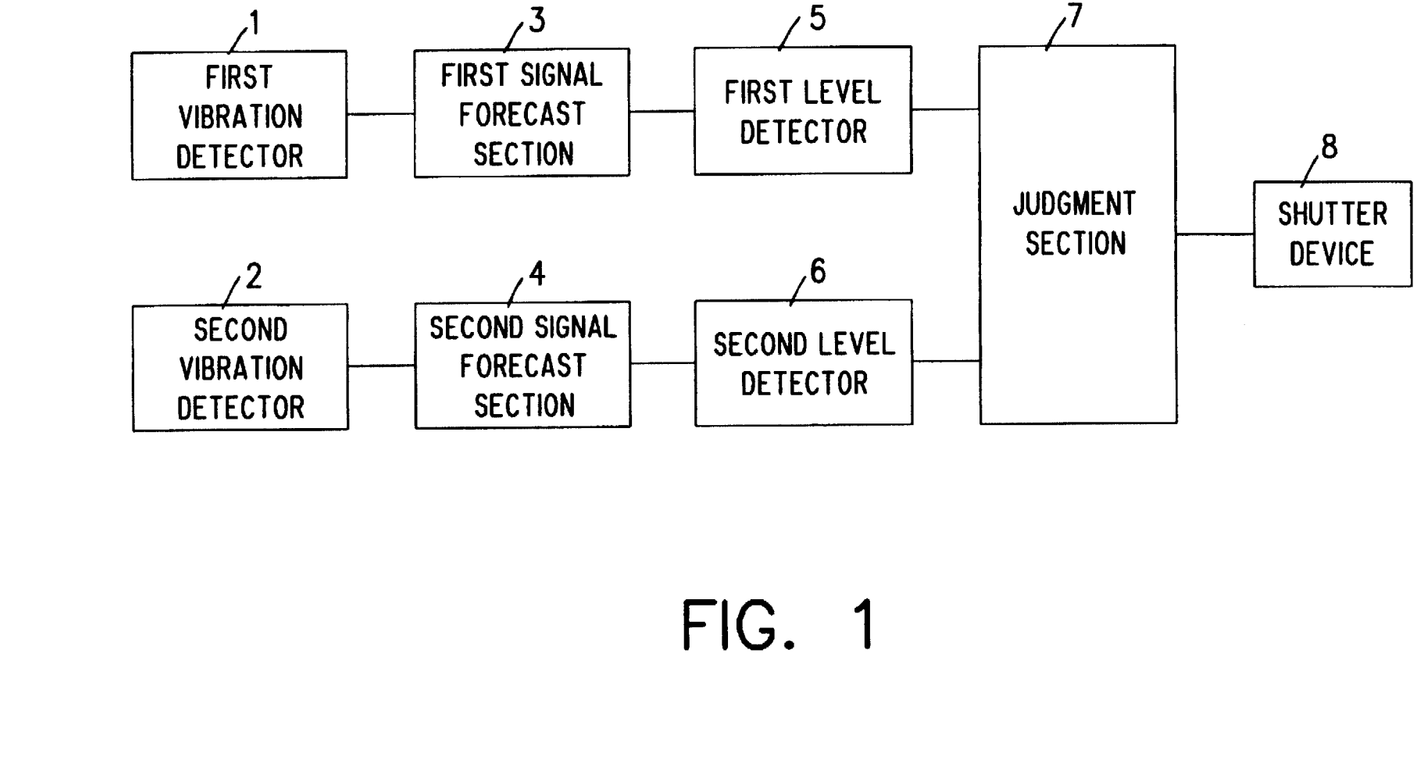
FIG. 1 illustrates the structure of an anti-shake camera according to a first embodiment of this invention.

As shown in FIG. 1, a camera of the first embodiment of this invention includes a first vibration detector 1, which detects a camera shake around an X axis direction (yaw direction) of an image plane in a camera. The camera of FIG. 1 also includes a second vibration detector 2, which detects a camera shake around a Y axis direction (pitch direction) of the image plane. The first vibration detector 1 and the second vibration detector 2 each comprises a known vibration gyro (angular velocity sensor) located in the camera. For instance, a GYROSTER (Trademark) manufactured by MURATA SEISAKUSHO or a CERAMICGYRO CG-16C manufactured by TOKIN can be used as a vibration gyro in this invention. The vibration detectors 1, 2 are also referred to as shake detectors 1, 2. The detection signal of the first vibration detector 1 is supplied to a first signal forecast section 3; the detection signal of the second vibration detector 2 is supplied to a second signal forecast section 4. The first signal forecast section 3 and the second signal forecast section 4 each calculates a value representing a shake condition, such as, for example, a shake velocity of the camera. The time at which each one of signal forecast sections 3 and 4 calculates these values depends on the corresponding camera shake detection signals from each of the first vibration detector 1 and the second vibration detector 2. The output of the first signal forecast section 3 is supplied to a first level detector 5, and the output of the second signal forecast section 4 is supplied to a second level detector 6. Shake acceleration sensors can be used as level detectors instead of shake velocity sensors. The first level detector 5 and the second level detector 6 each detects whether or not any one of the camera shake condition values calculated by the corresponding sections 3, 4 is either below a predetermined level or is zero. Judgment section 7 judges whether or not to begin an exposure operation based on the outputs from the first and the second level detectors 5 and 6. A shutter device 8 performs an exposure operation in response to the output from the judgment section 7.

This anti-shake camera is operated as follows. The first vibration detector 1 detects a camera shake around the X axis direction (pitch direction) of the image plane of the camera, and the second vibration detector 2 detects a camera shake around the Y axis direction (yaw direction) of the image plane. Detecting outputs from these first and second vibration detectors 1,2 are taken into a microcomputer (CPU) not shown in drawings, and are converted to digital signals from analog signals by an A/D converting function provided in the CPU. These digital signals are sent to the first signal forecast section 3 and the second forecast section 4, respectively.

The first signal forecast section 3 and the second signal forecast section 4 each calculates a camera shake condition value based on respective outputs of the first vibration detector 1 and the second vibration detector 2. The results of the forecasting calculations of the forecast sections 3 and 4 are respectively sent to the first level detector 5 and the second level detector 6. A time lag exists from the timing of sending the exposure start signal to the shutter until the actual start of the opening action of the shutter. The reason for the forecasting calculation is to take this time lag into consideration.

The first level detector 5 and the second level detector 6 detect whether or not the forecasted camera shake condition values supplied from the corresponding one of the first signal forecast section 3 and the second signal forecast section 4 are within a predetermined level, or whether or not any one of these camera shake condition values has become zero. The level information detected here is sent to the judgment section 7.

The judgment section 7 decides whether or not to activate the shutter device 8 and begin the exposure action. The judgment section activates the shutter device 8 when both of the forecasting shake condition values from the first level detector 5 and the second level detector 6 fall below a predetermined level or achieve a zero level condition within a predetermined time. The predetermined level is set to a level that corresponds to a camera shaking motion that is small enough to make any photograph blurring inconspicuous.

Figure 2:
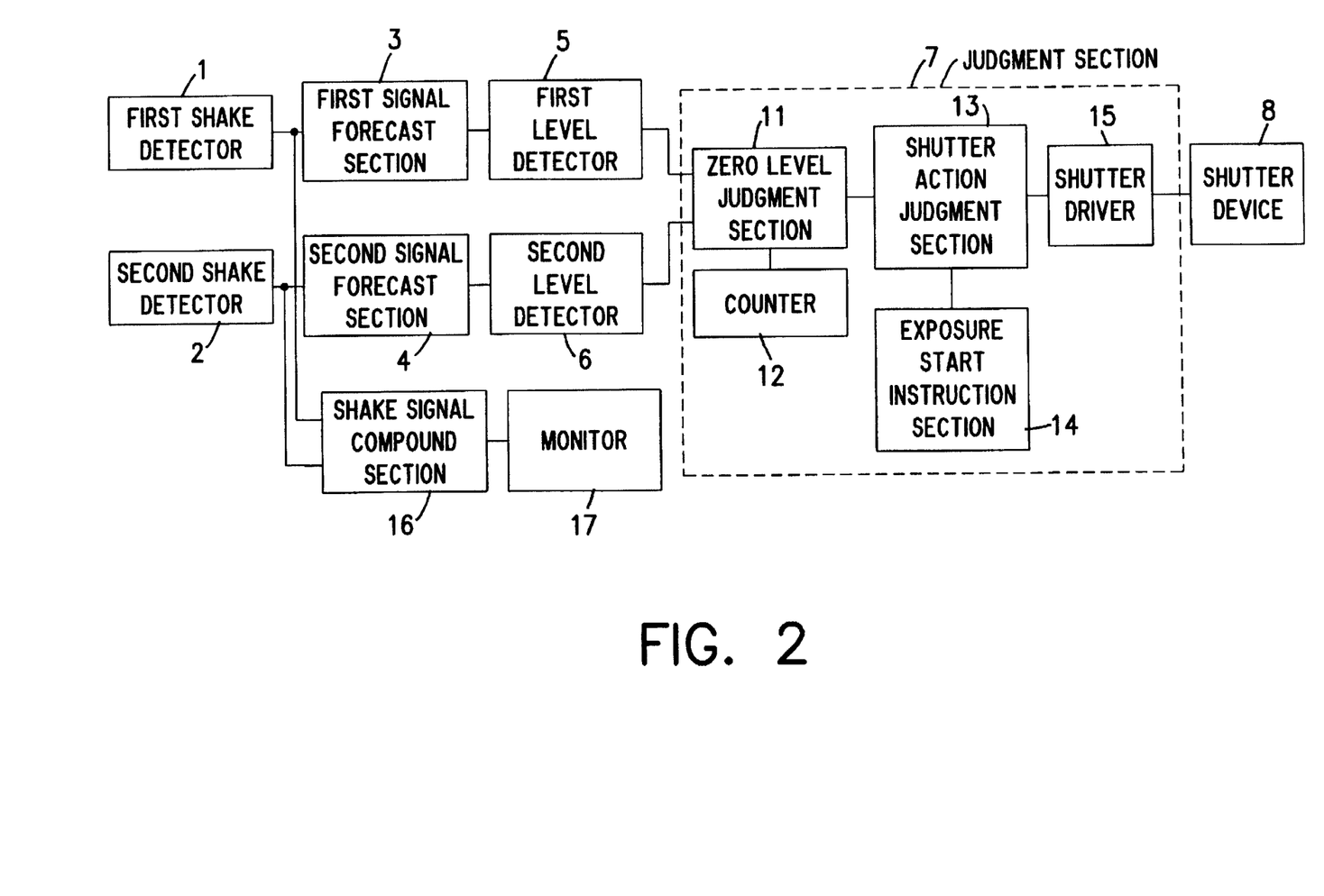
FIG. 2 illustrates the structure of an anti-shake camera according to a second embodiment of this invention.

FIG. 2 illustrates the second embodiment of an anti-shake camera of this invention. Sections of the camera of FIG. 2 that are similar to corresponding sections of the camera of FIG. 1 are designated with the same reference characters and a discussion of these similar sections, except where otherwise noted, shall not be repeated here.

Corresponding sections to the judgment section 7 in FIG. 1 are a zero level judgment section 11, a time counter 12, a shutter action judgment section 13, an exposure start instruction section 14 and a shutter drive section 15. In the first embodiment, the first and the second level detectors 5, 6 detect when the forecasting camera shake condition falls below a predetermined value or becomes zero. But in this second embodiment, the first and the second level detectors 5, 6 detect when the shake velocity achieves a zero or zero cross condition. A "zero cross", as shall be further described in connection with FIG. 6, occurs when a waveform plotted against time crosses the time axis.

The outputs of each of the first level detector 5 and the second level detector 6 are supplied to zero level judgment section 11. The zero level judgment section 11 causes time counter 12 to begin a time count when one of the level detectors 5, 6 produces an output signal that achieves a zero or zero cross condition. If the other level detector produces an output signal that also achieves a zero or zero cross condition before the time count reaches a predetermined value, the zero level judgment section 11 sends to the shutter action judgment section 13 an information signal indicating that a zero level or zero cross is detected by both of the first level detector 5 and the second level detector 6 within a predetermined period of time. The shutter action judgment section 13 checks whether the exposure start instruction has been obtained from the exposure start instruction section 14. If so, the shutter action judgment section 13 activates the shutter device 8 through the driver 15 for the exposure.

If the counter 12 reaches the predetermined value before both level detectors 5, 6 detect a zero or zero cross condition, then the judgment section will not activate the shutter. In this case, the counting operation in the time counter 12 is reset.

The shake signal compound section 16 receives each camera shake detection signal from the first shake detector 1 and the second shake detector 2, and generates a compound signal representing a shake condition value at the measuring time from these two signals. And this compound signal is sent to a monitor 17, which produces either a visual or audible indication of the camera shake level.

In this embodiment, each of the first and the second signal forecasting sections 3 and 4, the first and the second level detectors 5 and 6, and the judgment section 7 have been depicted as separate hardware elements. Alternatively, the first and the second signal forecasting sections 3 and 4, the first and the second level detectors 5 and 6, the zero level judgment section 11, the time counter 12, the shutter action judgment section 13, and the shake signal compound section 16 can be configured in a single microprocessor(CPU). In this case, every function would be conducted by software, thereby simplifying the structure.

Although the zero level judgment section 11 judges if the exposure start signal is generated after the first and the second level detectors 5,6 detect zero or zero cross in the above explanation, as a modification of the second embodiment, the forecasting operation, the level detecting operation, and the zero level determining operation described above can be started after the exposure start instruction input by a operator through the exposure start instruction section 14.

To put it concretely, the exposure start instruction is generated when the release operation is made. When the camera is in a standby condition, as in the case when a release button is pressed down half-way, the shake signal compound section 16 compounds the current camera shake information based on outputs from the first shake detector 1 and the second shake detector 2. The display 17 indicates a level of the camera shake based on this camera shake information.

Figure 3:
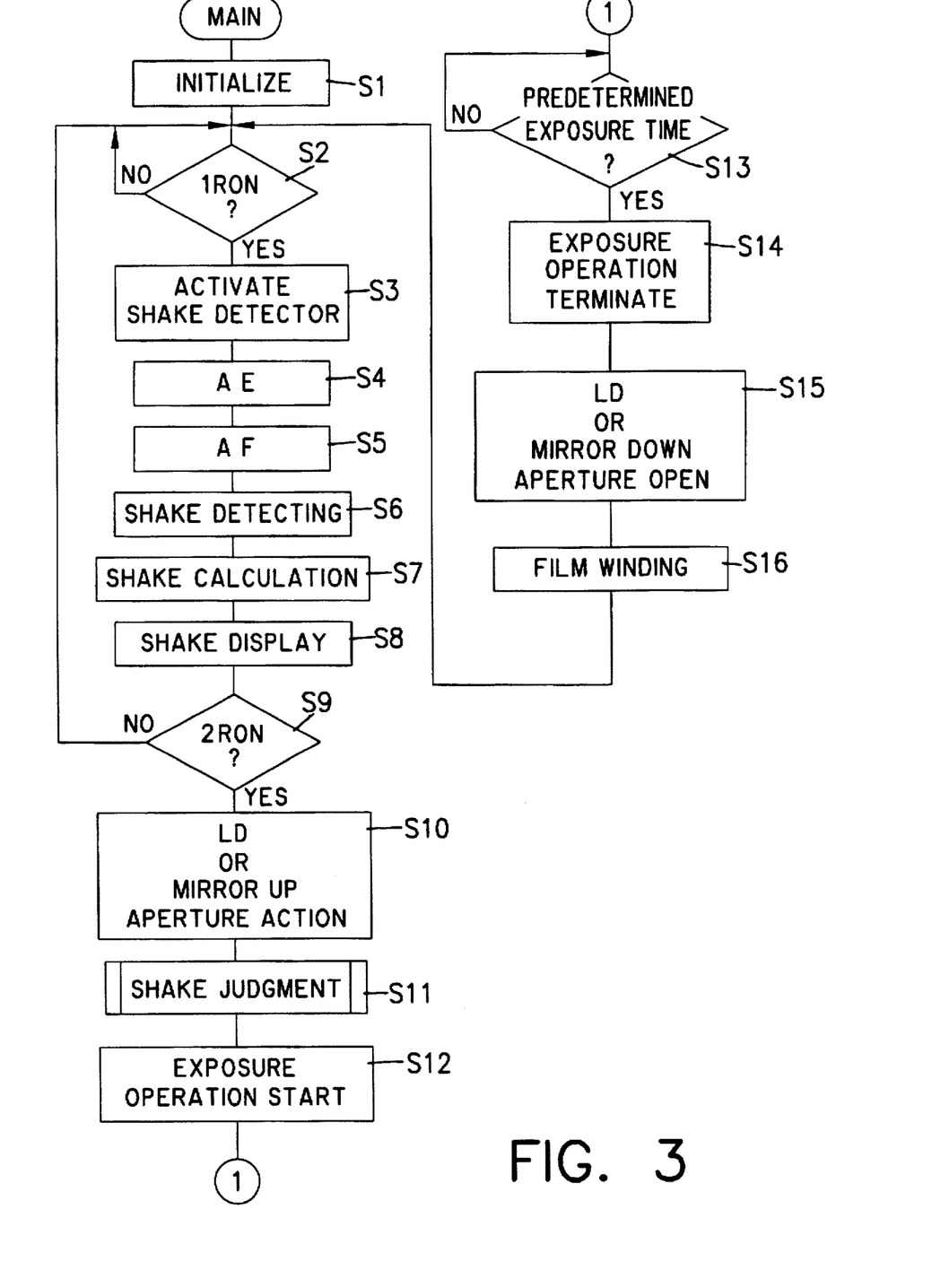
FIG. 3 is a main flow chart which illustrates an operation of an anti-shake camera of the modification of the second embodiment.
Figure 4:
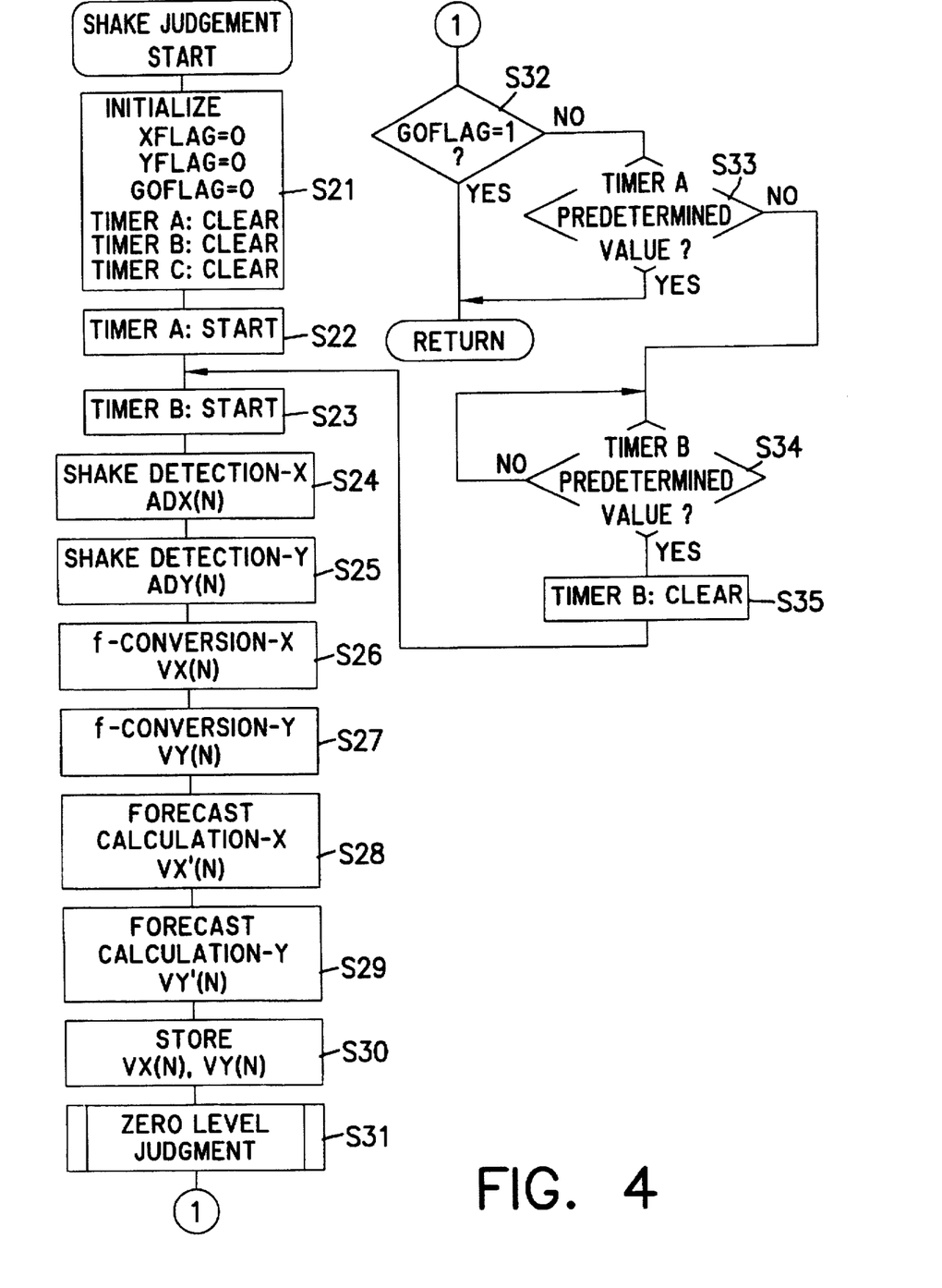
FIG. 4 is a flow chart which illustrates a process of a camera shake determination in the main flow chart shown in FIG. 3.
Figure 5:
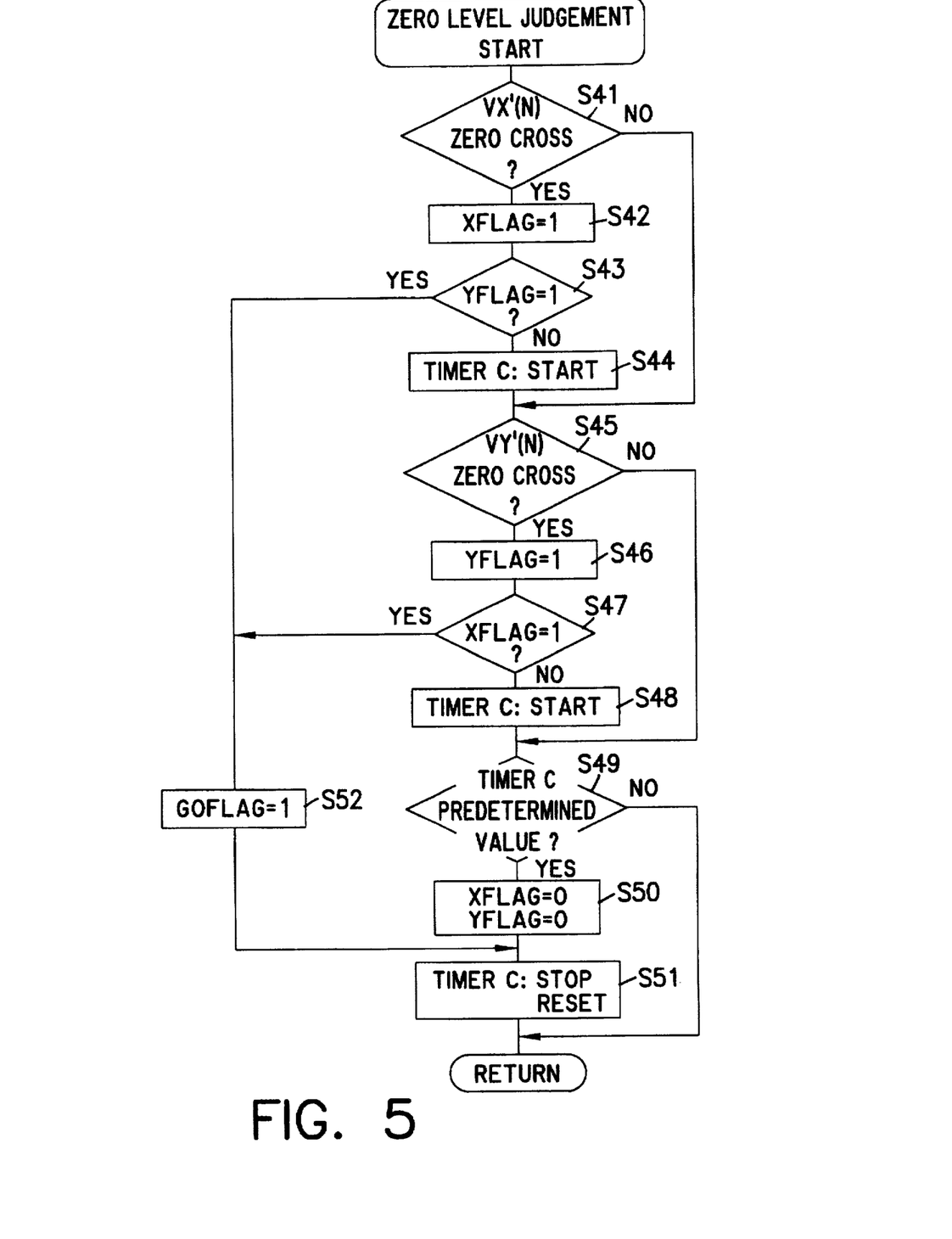
FIG. 5 is a flow chart which illustrates a process of a zero level determination in the flow chart shown in FIG. 4.

FIGS. 3, 4, and 5 are flowcharts relating to a modification of the second embodiment of this invention. Although the first and the second signal forecasting sections 3 and 4, the first and the second level detectors 5 and 6, the zero level judgment section 11, the time counter 12, the shutter action judgment section 13, and the shake signal compound section 16 are configured in a microprocessor(CPU), the disclosed structures are otherwise identical as those that are disclosed in the above second embodiment, and as a consequence, a detailed explanation is omitted.

FIG. 3 is a main flowchart of an operation of the anti-shake camera.

First, the CPU initializes the camera (step S1). Following this, the CPU checks if the release button, which is not shown in the drawings, is pressed half-way down (i.e. if a first release switch (1R) is on) (step S2). When the 1R switch is on, the CPU activates the first shake detector 1 and the second shake detector 2 in order to detect the camera shake (step S3). If the activation of detectors 1, 2 have been already made, this step S3 can be ignored. On the other hand, if the 1R switch has not been turned on, the CPU repeats the check of the step S2 and goes to the step S3 when the 1R switch is turned on.

Following this step, the CPU conducts an exposure measurement(AE) by a light measurement means not shown in the drawings (step S4), and then conducts a distance measurement operation or a focus detect operation (AF) by a distance measurement means or a focus detect means not shown in the drawings (step S5). In case of a single reflex camera, driving the objective lens to the focus position is made following the above steps.

Subsequently to this, the CPU samples and obtains outputs from shake detectors 1, 2, which were activated in the step S3 (step S6). The CPU carries out a focus length conversion based on sampling output from the shake detectors 1 and 2, and the shake signal compound section 16 converts the camera shake information to an image blur information (step S7).

The CPU activates display 17 to indicate and notify, either visually or audibly, a current shake condition (step S8).

In the next step, the CPU checks if the release button is fully pressed down; that is, the CPU checks whether the second release (2R) switch is on (step S9). This ON signal of the 2R switch corresponds to the exposure operation start instruction from the exposure operation start instruction section 14. When the 2R switch is OFF, the CPU goes back to the step S2 and repeats the process after S2. When the 2R switch is ON, a camera lens system is driven to focus to the object for a lens shutter camera, and a mirror up action and aperture action is performed for a single reflex camera (step S10).

Following this step, the CPU make the "shake judgment" as to at which timing it should start the exposure action (step S11). The process of the "shake judgment" will be explained in detail in FIG. 4 later. After S11, the timing to start an exposure action begins, and the CPU activates the shutter device 8 to start an exposure (open the shutter) (step S12).

Subsequently the CPU judges if it elapses the predetermined exposure time which was pre-calculated in the step S4 (step S13). If the predetermined time has not elapsed, this step 13 is repeated. When the predetermined exposure time elapses, the CPU terminates the exposure (close the shutter) (step 14). Then, the focusing lens is returned to the initial position for a lens shutter camera. For a single reflex camera, the mirror, shutter, and aperture return to their respective initial positions(step S15). The exposure process of one frame is completed here, and a film is winded up to the next frame, and then the CPU goes back to the step S2 and continues the above operation sequence (step S16).

FIG. 4 is a flowchart showing the process of the "shake judgment" in the main flowchart shown in FIG. 3.

The CPU resets (clears) flags, timers and so on that are used for the shake judgment, when the "shake judgment" process is initiated (step S21).

At first, the CPU starts a timer A (step S22). This timer A is inserted to avoid the situation when the actual exposure is not started for a long time because the camera shake information based on the first and the second shake detectors 1and 2 has not achieved a zero level. If this timer counts to its predetermined value, the exposure is started regardless of the shake condition of the camera.

The CPU also starts a timer B. This timer B is used for sampling outputs from the first shake detector 1 and the second shake detector 2 at regular intervals (step S23).

In the next step, the CPU takes a sampling of the output from the first shake detector 1. This output corresponds to the camera shake information pertaining to the X-axis direction on the image plane (step S24). This information is named ADX(N) here. And the output from the second shake detector 2, which corresponds to the camera shake information pertaining to the Y-axis direction on the image plane (step S25). This information is named ADY(N) here.

Subsequently, a focus length distance conversion is performed, in which the ADX(N) sampled in the step S24 is converted into image shake information VX (N), and in which the ADY (N) sampled in the step S25 is converted into the image shake information VY (N) (step S27). The reason for calculating the focus length distance conversion is to consider the change of the shake condition on the film depending on the focus length distance of the lens. In case of zoom lenses, focus length distance information detectors are necessary to be installed and the calculation is made by an output from this detector.

At the next step, the forecast calculation of the camera shake (image shake) is conducted based on the value VX(N). This forecasting calculation forecasts the image shake condition within a predetermined time based on the current image shake information VX(N) and an image shake information VX(N-α) at a predetermined previous time. This α is a pre-selected value. Image shake information VX, VY corresponding to this α are stored in a memory in a way described later. In this embodiment, the predetermined time is set to a time lag measured from the time an exposure action starting signal is generated to the time that the exposure action begins. This time lag can be also set to various other appropriate time that are suitable for the camera; for instance, the time lag can be measured from the time the exposure action starting signal is generated to a time that is during the actual exposure action. With respect to the manner for performing this forecasting calculation, the techniques disclosed in Japanese patent laid open applications 93-204012, 204013, 204014 filed by this assignee can be used. This image shake condition information forecasted here is named VX' (N).(step S28).

Furthermore, the camera shake (image shake) is forecasted based on VY(N) converted in the step S27 as well. This forecasting calculation forecasts an image shake condition after a certain time has elapsed time based on the current image shake information VY(N) and the image shake information at a predetermined previous time VY(N-α). This α value is determined as explained before. Here, this information of forecasted image shake condition is named VY' (N)(step S29).

The next step is to store the VX(N) and VY(N) values, into a memory (not shown in drawings) (step S30). These stored VX(N) and VY(N) values are used as values VX(N-α) and VY(N-α) in order to perform the forecasting calculation in steps S28 and S29 after the next sampling of new values VX(N), VY(N) is taken.

Following this step, the CPU conducts a "zero level judgment", that is, a judgment as to whether the camera shake is small enough or not, based on the image shake information forecasted at steps S28 and S29 (step S31). The detail as to how to do "zero level judgment" is explained later in connection with the flowchart of FIG. 5.

The CPU next checks whether the flag "GOFLAG" is "1" (step S32). The CPU allows the exposure operation to start when "GOFLAG" is "1" and does not allow the exposure operation to start when "GOFLAG" is "0". When "GOFLAG" is "1", the CPU returns to the step S12 in the flowchart shown in FIG. 3. On the other hand, when "GOFLAG" is not "1", the CPU checks if the timer A has counted to its predetermined maximum value (predetermined time) (step S33). When the timer A counts to this predetermined maximum value (predetermined time), the CPU returns to the step S12 in the flowchart shown in FIG. 3. The reason why the CPU operation exits the flowchart shown in FIG. 4 when the timer A counts to the predetermined value in spite of "GOFLAG" being "0", is to avoid delaying the start of the exposure operation for an undue length of time.

On the other hand, the CPU checks if the timer B counts to its corresponding predetermined time when the predetermined time has not been counted in the step S33 (step S34). If the timer B has not counted to this predetermined value (predetermined time), the above step S34 is repeated until it counts to this predetermined value. The reason for repeating this step until the timer B counts to this predetermined value here, is, as it is mentioned before, to obtain samplings of the outputs from the first shake detector 1 and the second shake detector 2 at regular intervals.

When the timer B counts to its predetermined time, the timer B is cleared (step S35) and the CPU goes back to the step S23 and repeats a loop from the step S23 to the step S35 until the timer A counts to its corresponding predetermined value.

FIG. 5 is a flowchart for the process of "zero level judgment" in the flowchart shown in FIG. 4.

Figure 6:
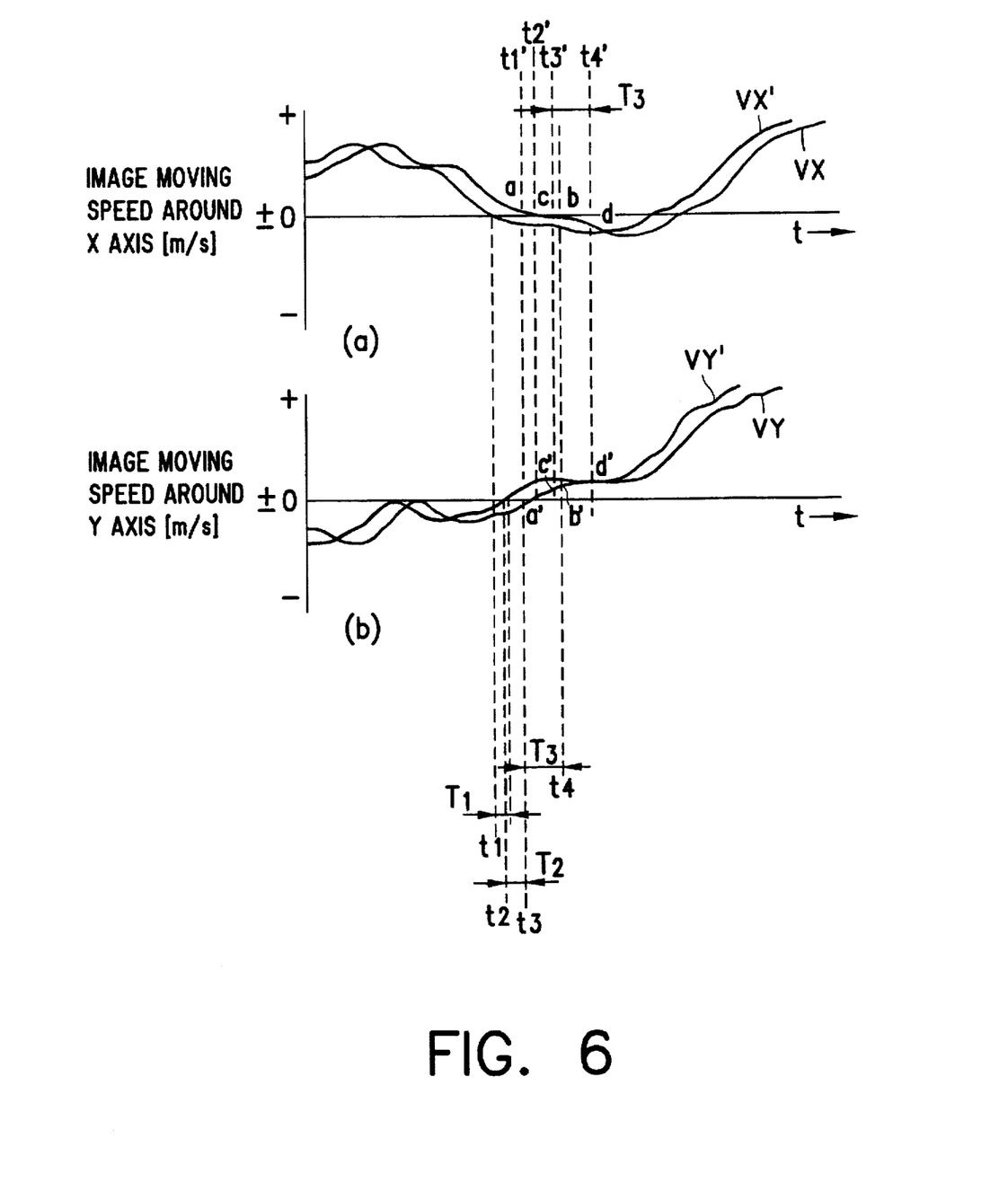
FIG. 6(a) illustrates an image moving speed along an X axis direction that is plotted against time.
FIG. 6(b) illustrates an image moving speed along a Y axis direction that is plotted against time.

When the process of "zero level judgment" starts, the CPU checks if the value VX' (N) has achieved a zero or zero crossing condition (step S41). To put it concretely, a "zero cross" is when the waveform locus crosses the time axis. For instance, in FIG. 6, the point "t1" of the wave figure locus VX' is where the image moving speed (wave figure locus VX) becomes ±0. FIG. 6 shows the relationship between time and the image moving speed X direction and the Y direction on the image plane. The Y axis represents image moving speed (m/s), and the X axis represents time "t" (s). The ±0 level for the Y axis means the image moving speed is zero, and '+' and '−' means a direction of the image movement.

When the VX' (N) achieves a zero cross condition in the step S41, the CPU goes to the step S42 explained below. When it is not, the CPU jumps to the step S45 described below. In the step S42, the CPU assigns the flag "XFLAG" with the value "1". This "XFLAG" is to represent whether or not the VX' (N) has achieved a zero cross condition. "XFLAG"="1" means that the VX' (N) has achieved a zero cross condition, and "XFLAG"="0" means that VX' (N) has not achieved such a condition.

Following this step, the CPU checks if the flag "YFLAG" is "1" (step S43). This "YFLAG" is to represent whether or not the VY' (N) has achieved a zero cross condition. "YFLAG"="1" means that the VY' (N) has achieved zero cross condition, and "YFLAG"="0" means VY' (N) has not achieve zero cross condition. And when "YFLAG" is "1", the CPU goes to a step S52 explained below. When "YFLAG" is not 11111, it goes to a step S44.

In the step S44, the CPU starts a timer C in response to "XFLAG"="1" in the step S42. This timer C is for counting a predetermined time. The CPU starts this timer C at the time when one of forecasting calculation results VX' (N) or VY' (N)crosses the zero level, and allows the exposure operation to start if the other forecast calculation result crosses zero level before the timer counts to this predetermined time.

The CPU checks whether VY' (N) has achieved a zero level or zero cross condition (step S45). If VY' (N) has achieved a zero cross condition, the CPU goes to the step S46. And if VY' (N) has not achieved such a condition, the CPU jumps to the step S49, later.

In the step S46, the CPU sets "YFLAG" to "1". Subsequently, the CPU checks if "XFLAG" is "1" (step S47). If "XFLAG" is "1", the CPU goes to the step S52, and If "XFLAG" is not "1", it goes to the step S48, which is discussed later.

In the step S48, the CPU starts the timer C in response to "YFLAG"="1" in the step S46.

Next, the CPU checks if the timer C has counted to its predetermined maximum value (predetermined time) (step S49). If the timer C has not counted to this predetermined value at this point, the CPU finishes the "zero level judgment" process and goes back to the step S32. If the timer C has counted to the predetermined value, the CPU goes to a step S50.

In the step S50, both "XFLAG" and "YFLAG" are reset to "0" in order to initialize the zero level judgment condition because this is a situation in which only one of the values VX' (N) and VY' (N) has crossed the zero level within the predetermined time.

Following this step, the CPU stops the timer C and resets it (step S51) so as to finish the "zero level judgment" process and goes back to the step S32 shown in FIG. 4.

If "YFLAG"="1" in the step S43 and XFLAG"="1" in the step S47, it is the case that both of VX' (N) and VY' (N) has achieved a zero cross condition within the predetermined time limited by the timer C. In this case, the CPU sets the flag "GOFLAG" to "1" (step S52) and then jumps to the step S51. This "GOFLAG" allows the exposure operation to start. This flag is checked at the step S32 in the flowchart shown in FIG. 4, and the exposure operation is commenced when this flag is "1".

As explained about the process of "zero level judgment" above, when both results of shake forecasting calculation VX' (N) and VY' (N) cross the zero level within the predetermined time, the "GOFLAG", which allows the exposure action to begin, is set. And if it is not the case, the "GOFLAG" is not set and the CPU exits this flowchart. When either VX' (N) or VY' (N) crosses the zero level, the CPU exits this flowchart while holding the condition of XFLAG and YFLAG until the timer C counts the predetermined time.

The structure and the operation of the anti-shake camera which is an embodiment of this invention were explained above, and from here, the image shake condition (speed) of this camera is explained using FIG. 6.

FIG. 6(a) is a diagram showing the image movement speed for the direction of X on the image plane, and FIG. 6(b) is a diagram showing the image movement speed for the direction of Y on the image plane. VX and VY are current image movement speed, and VX' and VY' are forecasted image movement speed.

In FIG. 6(a), the VX' is crossing the zero level at the timing "t1". With respect to the modification of this second embodiment, when this zero cross is detected, the CPU goes to the step S42, where "XFLAG" is set to "1", based on the judgment shown in the step S41 in the flowchart. At the following step S43, the flag "YFLAG" is checked. Since VY' has not crossed the zero level at this time "t1", the timer C is started at the step S44. The time period counted by the timer C, that is, the time limit checked at the step S49, is "Ti" shown in FIG. 6. If VY' crosses the zero level during this time period "T1", the CPU allows the exposure operation to start.

In this example, VY' crosses the zero level at the timing "t2". When this zero cross is detected, the CPU goes to the step S46 and sets the flag "YFLAG" to "1". Subsequently, the CPU checks "XFLAG" at the step S47. Because the predetermined time "T1" has not elapsed and "XFLAG" is still "1" at this time "t2", the CPU sets the flag "GOFLAG" to "1" at the timing "t2" in order to start the exposure operation.

Although the beginning of the exposure operation is ordered at the step S12 in the flowchart shown in FIG. 3, the actual exposure starts at the timing "t3" in FIG. 6. This is due to a mechanical time lag in the shutter device 8, which corresponds to the timing "T2" between the timing "t2" and "t3" in FIG. 6. The timing "T3" between the timing "t3" and "t4" corresponds to the actual exposure time period. Image movement speed values during this period of time "T3" are shown as a-b and a'-b', locus of VX and VY.

In order to show the effect of the above modification of the embodiment, an example in which the similar judgment and operation is made based on VX and VY without using the forecasting of subsequent camera shake is explained next. In FIG. 6, timings t1', t2', t3' and t4' correspond to timings t1, t2, t3, and t4, respectively. The time period between "t1'" and "t2'" is the same "T1" (the predetermined time), the time period between "t2' " and "t3'" is the same "T2" (the mechanical time lag) and the time period between "T3'" and "t4l" is the same "T3" (the exposure time).

The image movement speed of the camera in this situation (i.e., without considering the forecasting of camera shake) during the actual exposure time corresponds to the time frame between t3' and t4', which are c-d and c'-d', locus of VX and VY shown in FIG. 6. Based on a comparison of the image movement speed at the timing between t3 to t4 with the speed at the timing between t3' to t4', it is clear that deciding the starting timing of the exposure operation based on the result of the forecasting camera shake can produce a more effective anti-shake result.

Although forecasting camera shake is effective for getting better anti-shake result mentioned above, this invention is not limited to this type and is applicable to cameras that do not forecast camera shake.

According to a simulation of the present invention, it was found out that if the predetermined time "T1" is set as a long time period, a high anti-shake effect is difficult to obtain, because the difference between VX' and VY' during the exposure period may become big. On the other hand, it was also confirmed in the simulation that if the predetermined time "T1" is set too short, it is difficult for both VX' and VY' to cross the zero level within the time period "T1". And this may cause a long time delay before the actual exposure operation starts. According to this simulation, the above predetermined time "t1" should be set at a duration that is less than or equal to the exposure time period.

In the above second embodiment, only one CPU 1) performs a calculation of one of forecasting shake value VX' or VY',2) detects if any forecasting shake value cross the zero level, 3) calculates the other shake forecasting value, 4) detects if this forecasting value crosses the zero level subsequently. But this invention is not limited to this type. Two independent CPUs, which calculate forecasting value VX' (N), VY' (N), respectively, and detect zero level crossing of VX' (N), VY' (N), respectively, can be equipped in the camera. Furthermore, calculations of forecasting for VX' (N) and VY' (N) can be conducted at the same time, and also above two detection can be operated at the same time.

As explained above, according to these embodiments, the timing of the minimum (zero) shake condition is forecasted based on camera shake information for two directions. And when the camera shake conditions in both directions becomes small (or zero) within the predetermined time period, the exposure operation is allowed to start. Therefore, a high anti-shake effect can be obtained.

What is claimed is:

1. An anti-shake camera, comprising:

a plurality of shake condition detectors, each shake condition detector detecting shake condition signals corresponding to a camera shake condition value in one of a plurality of different directions;

shake condition forecasting means for forecasting a shake condition value for each of the directions in accordance with the detecting signals from each one of the plurality of shake condition detectors;

detecting means for detecting when each forecast shake condition value achieves a corresponding one of a plurality of predetermined levels;

judgment means for judging if each forecast shake condition value achieves the corresponding predetermined level within a predetermined time, the judgment means producing an activation signal if each forecast shake condition value achieves the corresponding predetermined level within the predetermined time; and exposure control means for controlling an exposure operation according to the activation signal from the judgment means.

2. The anti-shake camera according to claim 1, further comprising a counter means for counting to the predetermined time, wherein the counter means begins counting to the predetermined time when at least one of the forecast shake condition values achieves the corresponding predetermined level.

3. The anti-shake camera according to claim 1, wherein the shake condition forecast means forecasts each shake condition value at predetermined intervals.

4. The anti-shake camera according to claim 1, wherein the predetermined time is set to be no more than an exposure time.

5. The anti-shake camera according to claim 1, wherein each of the predetermined levels is zero.

6. The anti-shake camera according to claim 1, wherein each of the directions is perpendicular to an optical axis of the camera, and wherein the directions cross each other perpendicularly.

7. An anti-shake camera, comprising:

image moving speed detecting means for detecting a moving speed of an image in a plurality of different directions and for producing for each direction a value indicative of the moving speed of the image detected along a corresponding one of the plurality of directions;

level detect means for detecting if each value achieves a corresponding one of a plurality of predetermined levels;

judgment means for judging if each value achieves the corresponding predetermined level, the judgment means producing an activation signal if each value achieves the corresponding predetermined level within a predetermined time; and exposure control means for controlling an exposure operation according to the activation signal from the judgment means.

8. The anti-shake camera according to claim 7, further comprising a counter means for counting to the predetermined time, wherein the counter means begins counting to the predetermined time when at least one of the values achieves the corresponding predetermined level.

9. The anti-shake camera according to claim 7, wherein the predetermined time is no more than an exposure time.

10. The anti-shake camera according to claim 7, wherein the predetermined time is counted by a timer function in a CPU.

11. An anti-shake camera, comprising:

a first shake condition detector for detecting a shake condition for a first direction;

a second shake condition detector for detecting a shake condition for a second direction;

a first shake forecaster for forecasting the shake condition for the first direction based on an output from the first shake condition detector;

a second shake forecaster for forecasting the shake condition for the second direction based on an output from the second shake condition;

a first shake level detector for detecting if the level of the shake forecasted by the first shake forecaster achieves a first predetermined level;

a second shake level detector for detecting if the level of the shake forecasted by the second shake forecaster achieves a second predetermined level;

judgment means for judging, based on an output of the first shake level detector and on an output of the second shake level detector, if the level of the shake detected by the first shake level detector achieves the first predetermined level within a predetermined time and if the level of the shake detected by the second shake level detector achieves the second predetermined level within the predetermined time; and exposure control means for controlling an exposure operation according to an output from said judgment means.

12. The anti-shake camera according to claim 11, further comprising a counter means for counting to the predetermined time, wherein the counter means begins accounting to the predetermined time when at least one of the level of the shake forecasted by the first shake forecaster and the level of the shake forecasted by the second shake forecaster achieves a corresponding one of the first predetermined level and the second predetermined level.

13. The anti-shake camera according to claim 11, wherein the predetermined time is no more than an exposure time.

14. The anti-shake camera according to claim 11, wherein the first predetermined level is the same as the second predetermined level.

* * * * *